(12) United States Patent
Kichlu et al.

(10) Patent No.: US 11,657,414 B1
(45) Date of Patent: May 23, 2023

(54) SYSTEMS AND METHODS FOR QUANTITATIVELY PREDICTING CHANGES TO EMPLOYEE NET PROMOTER SCORES

(71) Applicant: Optum, Inc., Minnetonka, MN (US)

(72) Inventors: Rohit Kichlu, Princeton Junction, NJ (US); Dakota Andrew Ritz, Newtown, PA (US); Erin Ratelis, Pewaukee, WI (US)

(73) Assignee: OPTUM, INC., Minnetonka, MN (US)

( * ) Notice: Subject to any disclaimer, the term of this patent is extended or adjusted under 35 U.S.C. 154(b) by 148 days.

(21) Appl. No.: 16/015,121

(22) Filed: Jun. 21, 2018

(51) Int. Cl.
| | |
|---|---|
| *G06Q 30/02* | (2023.01) |
| *G06Q 10/10* | (2023.01) |
| *G06Q 30/0203* | (2023.01) |
| *G06Q 10/105* | (2023.01) |
| *G06N 5/022* | (2023.01) |

(52) U.S. Cl.
CPC ......... *G06Q 30/0203* (2013.01); *G06N 5/022* (2013.01); *G06Q 10/105* (2013.01)

(58) Field of Classification Search
CPC ... G06Q 30/0203; G06Q 10/105; G06N 5/022
USPC ........................................................ 705/347
See application file for complete search history.

(56) References Cited

U.S. PATENT DOCUMENTS

| | | | |
|---|---|---|---|
| 9,497,136 B1 | 11/2016 | Ramarao et al. | |
| 9,716,792 B2 | 7/2017 | McGann et al. | |
| 9,723,145 B2 | 8/2017 | Bell et al. | |
| 9,762,733 B1 | 9/2017 | Ramanujaiaha et al. | |
| 10,867,269 B2 * | 12/2020 | Grady Smith | G06Q 10/0637 |
| 2008/0065471 A1 | 3/2008 | Reynolds et al. | |
| 2013/0282430 A1 | 10/2013 | Kannan et al. | |
| 2014/0019178 A1 | 1/2014 | Kortum et al. | |
| 2014/0143017 A1 | 5/2014 | Kannan et al. | |
| 2014/0200930 A1 * | 7/2014 | Zizzamia | G06Q 40/08 |
| | | | 705/4 |
| 2014/0236858 A1 | 8/2014 | Abel et al. | |
| 2014/0316856 A1 * | 10/2014 | Williams | G06Q 30/02 |
| | | | 705/7.32 |

(Continued)

FOREIGN PATENT DOCUMENTS

| | | | |
|---|---|---|---|
| WO | 2016/122532 A1 | 8/2016 | |
| WO | WO-2016122532 A1 * | 8/2016 | G06Q 30/02 |

(Continued)

OTHER PUBLICATIONS

Miller, Stephen, "Employees are more likely to stay if they like their health plan," SHRM [online], published on Feb. 14, 2018, available at: < https://www.shrm.org/resourcesandtools/hr-topics/benefits/pages/health-benefits-foster-retention.aspx > (Year: 2018).*

(Continued)

*Primary Examiner* — Richard W. Crandall
(74) *Attorney, Agent, or Firm* — Alston & Bird LLP

(57) ABSTRACT

An employee net promoter score (eNPS) adjustment system and method adjusts an employee net promoter score (eNPS) using a predictive model. The predictive model identifies key eNPS driver variables and adjusts a programmatically generated quantification of employee engagement and/or sentiment toward an employer based upon received data representing the key eNPS driver variables.

16 Claims, 20 Drawing Sheets

(56) References Cited

U.S. PATENT DOCUMENTS

| | | | |
|---|---|---|---|
| 2014/0324521 A1* | 10/2014 | Mun | G06Q 30/0201 |
| | | | 705/7.28 |
| 2015/0051957 A1 | 2/2015 | Griebeler et al. | |
| 2015/0269244 A1* | 9/2015 | Qamar | G06Q 10/06398 |
| | | | 705/7.42 |
| 2016/0042359 A1 | 2/2016 | Singh | |
| 2016/0314418 A1* | 10/2016 | Varghese | G06Q 10/0635 |
| 2016/0342911 A1* | 11/2016 | Kannan | G06Q 10/0631 |
| 2016/0350718 A1* | 12/2016 | Raymondi | G06Q 10/1057 |
| 2016/0371703 A1 | 12/2016 | Monegan et al. | |
| 2016/0373950 A1 | 12/2016 | Niemoeller | |
| 2017/0024646 A1 | 1/2017 | Yang et al. | |
| 2017/0024827 A1 | 1/2017 | McGill et al. | |
| 2017/0193521 A1 | 7/2017 | Backer et al. | |
| 2017/0270416 A1 | 9/2017 | Sri et al. | |
| 2017/0300643 A1* | 10/2017 | Bezark | G16H 20/70 |
| 2018/0034966 A1 | 2/2018 | Te et al. | |
| 2018/0107734 A1* | 4/2018 | Galia | G06Q 40/08 |
| 2019/0318370 A1* | 10/2019 | Kopikare | H04W 4/21 |

FOREIGN PATENT DOCUMENTS

| | | |
|---|---|---|
| WO | 2017/027718 A1 | 2/2017 |
| WO | 2017/141261 A2 | 8/2017 |

OTHER PUBLICATIONS

West Allis Employee Benefit Survey, [online], published Feb. 7, 2018, available at: < https://www.westalliswi.gov/DocumentCenter/View/10344/City-of-West-Allis-Employee-Benefit-Survey?bidId=> (Year: 2018).*

SurveyTown, "What Makes Your Survey Statistically Significant?" [online], published on Dec. 13, 2016, available at: < https://surveytown.com/survey-statistically-significant/> (Year: 2016).*

SurveyTown Blog, available at: < https://web.archive.org/web/20170227000659/http://surveytown.com/blog/ > archived on Feb. 27, 2017 (Year: 2017).*

SurveyTown homepage, available at: <https://web.archive.org/web/20170226184605/http://surveytown.com/ > archived on Feb. 26, 2017 (Year: 2017).*

Telefaction, Services, Internet Archive Captured on Jul. 3, 2016, Telefaction, 3 pages, https://telefaction.com/en/services/, Oct. 29, 2018.

Brandstack, Tommi, Evaluating the relationship between strategic objectives and process metrics in the service business, Master's Thesis, Nov. 28, 2017, Aalto University, School of Science, 104 pages, https://aaltodoc.aalto.fi/bitstream/handle/123456789/29395/master_Brandstack_Tommi_2017.pdf?sequence=1, Oct. 29, 2018.

Final Office Action for U.S. Appl. No. 16/020,839, dated Jun. 15, 2021, (33 pages), USA.

Chiang, Wei-yu Kevin et al. "Predicting and Explaining Patronage Behavior Toward Web and Traditional Stores Using Neural Networks: A Comparative Analysis With Logistic Regression," Decision Support Systems, vol. 41, No. 2, (2006), pp. 514-531.

NonFinal Office Action for U.S. Appl. No. 16/020,839, dated Jan. 6, 2021, (53 pages), U.S. Patent and Trademark Office, USA.

Chiang, Wei-yu Kevin et al. "Predicting and Explaining Patronage Behavior Toward Web and Traditional Stores Using Neural Networks: A Comparative Analysis With Logistic Regression, Decision Support Systems," vol. 41, Jan. 2006, pp. 514-531.

NonFinal Office Action for U.S. Appl. No. 16/020,839, dated Dec. 22, 2021, (44 pages). United States Patent and Trademark Office, USA.

Final Office Action for U.S. Appl. No. 16/020,839, dated May 20, 2022, (46 pages), United States Patent and Trademark Office, US.

NonFinal Office Action for U.S. Appl. No. 16/020,839, dated Dec. 1, 2022, (37 pages), United States Patent and Trademark Office, US.

* cited by examiner

SYSTEMS AND METHODS FOR QUANTITATIVELY PREDICTING CHANGES TO EMPLOYEE NET PROMOTER SCORES

BACKGROUND

An employee Net Promoter Score (eNPS) is an index ranging from −100 to 100 that measures the willingness of employees to recommend a company with which they are employed to others. The eNPS can provide employers with a snapshot of employee loyalty and engagement within their company. The eNPS is based on a single question: "[o]n a scale of 0-10, how likely is it that you would recommend [company name] to your friends, family or business associates." Respondents who indicate a 6 or below are "detractors," those who indicate a score of 7-8 are "passives," and those who indicate a score of 9-10 are "promoters." Calculating the eNPS from the survey responses involves a procedure of subtracting the percentage of detractors from the percentage of promoters. However, determining how employee experiences translate into the employee survey responses affecting the eNPS has historically not been done, ostensibly because attempting to do so would be viewed as a qualitative and subjective process prone to bias and inaccuracy.

Accordingly, there is a latent need for a rigorous methodology that can predict the effectiveness of efforts to improve employee sentiment toward an employer as reflected by an eNPS. Such predictions would provide actionable insight enabling a company to change its operations in targeted ways that maximize employee loyalty and engagement. Through applied effort, ingenuity, and innovation, the inventors have developed systems and methods that produce such predictions. Some examples of these solutions are described in detail herein.

SUMMARY

Over the last two decades, US-based employers have focused on offering employee well-being programs primarily as a means of controlling rising health care costs. But well-being programs have the potential to do much more for an organization. In particular, the internal value proposition of employee well-being programs in reality extends beyond its effect on health care costs, and affects other business metrics, including productivity (e.g., absenteeism and presenteeism), safety, overall employee engagement, loyalty, and job satisfaction, among others. However, because the effects of employee well-being programs on these areas are difficult to quantify, they have historically not been an area of focus for many organizations. Moreover, there is potentially a vast amount of data available that can be considered relevant to eNPS but it is unknown just how relevant one area of data may be in comparison to another. Performing such analysis and quantification in a meaningful way without the use of a specialized solution is nearly impossible, especially in a time frame within which the analysis would be relevant to an organization.

The inventors have determined that manual and/or brute force approaches to analysis of data related to eNPS and programmatic quantification of the connection between employee well-being programs and certain metrics suffer from at least the following issues: (1) The time required to perform such manual or brute force analyses takes longer than the time during which the data remains meaningful; (2) The amount of data available for the analyses makes it nearly impossible to determine what variables are the most relevant/important drivers for an eNPS, thereby requiring more computing resources (i.e., processing time, processing power, data storage); and (3) Brute force and/or manual approaches are not suited to learning models that can be programmatically applied to the vast amount of data required for the analyses.

Accordingly, the inventors have determined that programmatic quantification of the connection between employee well-being programs and certain metrics would illustrate ways that business can address a wider range of business goals through the targeted application of employee well-being programs, and further demonstrate the actual value of such programs. A critical metric is the eNPS towards an employer. Example embodiments described herein comprise methods and systems that provide tools quantitatively illustrating a connection between employer investment in well-being programs and the eNPS towards the employer. The embodiments described herein further comprise methods and systems that provide tools that programmatically generate computational relationships between eNPS driver variables and predicted changes in eNPS for an employer.

To enable a user to understand the impact on eNPS from changes to investment in wellbeing programs and employee participation/awareness, embodiments described herein utilize a model trained on historical data that quantifies how changes in an employer's wellbeing programs and employee participation/awareness have affected an eNPS in the past. In conjunction with a user-friendly graphical user interface (GUI) designed to elicit certain baseline criteria regarding an employer and its employees, this model enables users to receive predictive insight into how modifications to wellbeing programs and/or employee participation/awareness offered by the employer could improve the eNPS for the employer.

Example embodiments described herein are designed to predict changes to an employee net promoter score (eNPS) for an employer. One example embodiment includes an apparatus comprising at least one processor and at least one memory including computer program code. The at least one memory and the computer program code are configured to, with the at least one processor, cause the apparatus to receive, from a user computing entity, an initial eNPS associated with an employer. In embodiments, the initial eNPS is a value received from the user computing entity that represents an estimated eNPS prior to the programmatic generation of an adjusted eNPS. In embodiments, the initial eNPS is a value based on a −100 to 100 eNPS scale. In embodiments, the initial eNPS is default set to 3. The apparatus is further caused to receive first data from the user computing entity, the first data comprising one or more selections of first eNPS key driver variable options from a plurality of first eNPS key driver variable options. The apparatus is further caused to receive second data from the user computing entity comprising an original selection of a second eNPS key driver variable option from a plurality of second eNPS key driver variable options. The apparatus is further caused to receive third data from the user computing entity. The third data may comprise one or more additional selections of first eNPS key driver variable options of the plurality of first eNPS key driver variable options. The apparatus is optionally further caused to receive fourth data from the user computing entity, the fourth data comprising an additional selection of a second eNPS key driver variable option from a plurality of second eNPS key driver variable options. In some embodiments, the additional selection of the second eNPS key driver variable option is different in comparison to the original selection of the second eNPS key driver variable option. The apparatus is optionally further caused to programmatically generate an adjusted eNPS for the employer using the trained model and based at least on the initial eNPS for the employer, the first data, the second data, the third data, and the fourth data. The apparatus is optionally further caused to transmit one or more of the adjusted eNPS for the employer and a percent difference between the initial eNPS and the adjusted eNPS to the user computing entity.

In some embodiments, the at least one memory and the computer program code configured to, with the at least one processor, further cause the apparatus to train the machine learning model using at least eNPS research data, and quantify an influence by each of variable of the plurality of variables on employee net promoter score (eNPS). In embodiments, based on the quantification of influence, the first eNPS key driver variable and the second eNPS key driver variable are identified.

In some embodiments, the first eNPS key driver variable represents a number of employee well-being programs the employer offered to employees. In some embodiments, the second eNPS key driver variable represents an average employee participation frequency in the number of employee well-being programs.

In some embodiments, the adjusted eNPS is different from the initial eNPS.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION

Having thus described the disclosure in general terms, reference will now be made to the accompanying drawings, which are not necessarily drawn to scale, and wherein:

FIG. 1 provides an illustration of an exemplary embodiment of the present disclosure;

FIG. 2 provides an illustrative schematic of an exemplary management computing entity according to one embodiment of the present disclosure;

FIG. 3 provides an illustrative schematic representative of an exemplary mobile computing entity that can be used in conjunction with embodiments of the present disclosure;

DETAILED DESCRIPTION

Figure 1:
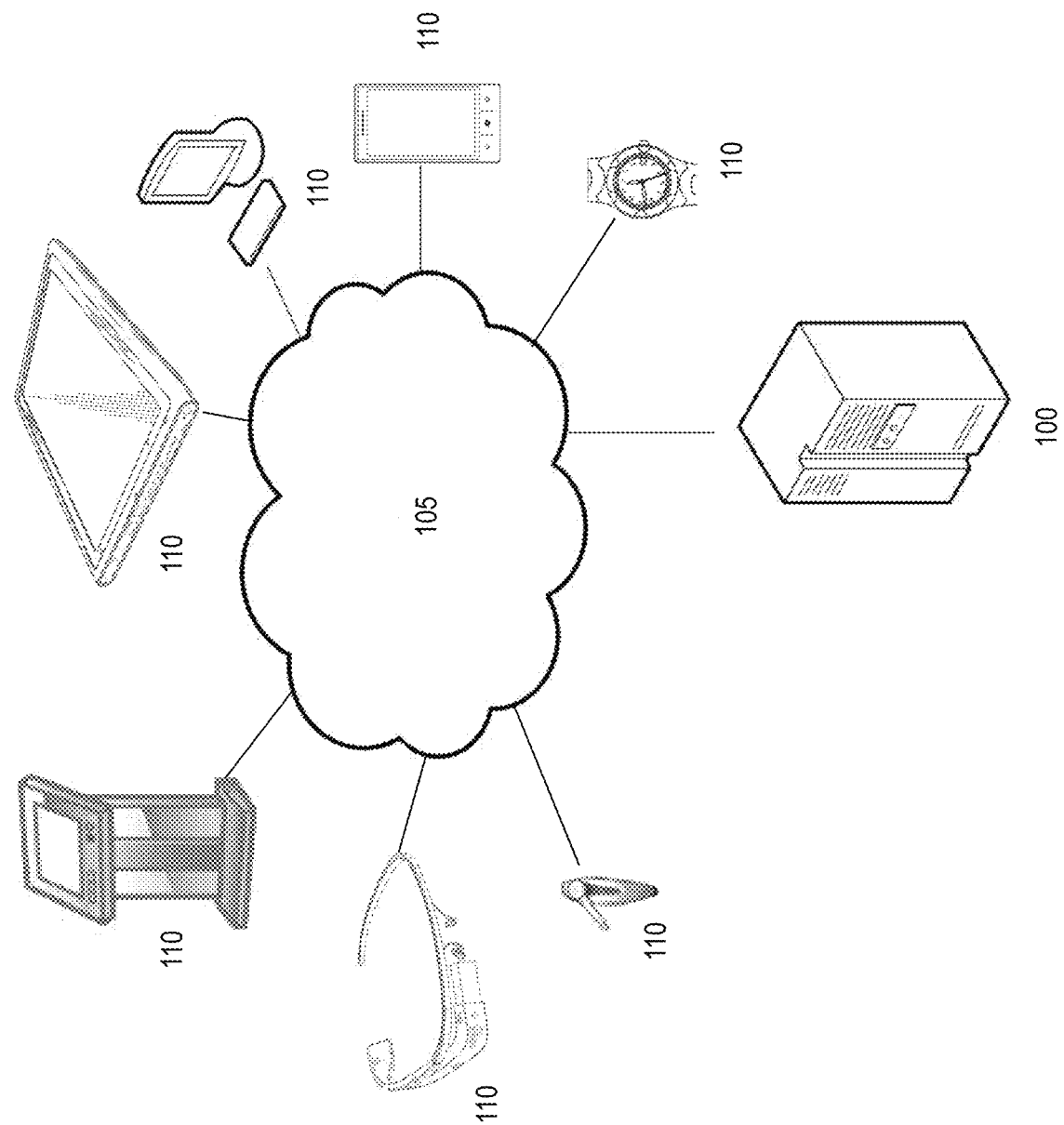

The present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. Like numbers refer to like elements throughout.

In recent years, employers have focused on offering employee well-being programs primarily as a means of controlling rising health care costs. However, as indicated above, well-being programs have the potential to do much more for an organization, such as improving employee productivity (e.g., absenteeism and presenteeism), safety, overall employee engagement, loyalty, and job satisfaction, among others. Because the effects of employee well-being programs on these areas are difficult to quantify, they have historically not been an area of focus for many organizations. As noted previously, example embodiments described herein comprise methods and systems that provide tools quantitatively illustrating a connection between employer investment in well-being programs and the eNPS towards the employer.

To develop this quantitative connection between well-being programs and the eNPS towards an employer, a two-part methodology may be used. The two-part methodology trains an algorithmic model that in turn fuels the logic behind the systems and methods described herein. To begin, a survey is taken of a statistically significant number of full-time employees who are provided with health insurance coverage through their employer. (note: employees came from a variety of employers across the US). The survey includes the eNPS question underlying the eNPS score (i.e., responses to the question "[o]n a scale of 0-10, how likely are you to recommend your employer to a friend or colleague who is considering applying for a job?"). In embodiments, the survey includes additional questions: (1) a question regarding a number of well-being programs offered by the employer, and (2) a question regarding frequency of employee participation in those well-being programs. The survey may also include a number of other questions relating to additional variables that may (or may not) play a role in affecting a given employee's response to the eNPS question.

A linear regression analysis may be run on the survey data to identify the top variables/key drivers that have a significant impact on an individual's response to the eNPS question. But this first linear regression model may only able to predict the mean change in employees' likelihood to recommend (i.e., response to the eNPS question). In this regard, because the eNPS score itself is based on the internal differences between individual employee responses to the eNPS question, an averaged result masks the connection between constituent components and the ultimate eNPS. Accordingly, additional data manipulation is required to determine how a change in the mean likelihood to recommend (i.e., a change in the mean response to the eNPS question), which acts as independent variable, affects the ultimate eNPS score for an employer, which is a dependent variable in this scenario.

Specifically, the survey data can be randomly divided into a series of groups, thus creating a series of distinct data sets that can be compared against each other. Associated with each data point is the mean score for likelihood to recommend and a respective NPS score for each random sample. Having multiple groups of data and using unstandardized coefficients associated with these drivers, example embodiments instantiate a model that predicts the change to the mean score of the dependent variable (the eNPS itself). In doing so, the unstandardized coefficient represents the impact on the eNPS for every point change to the mean score for likelihood to recommend. In one example, it was determined that a one point increase (or decrease) in the mean score of a driver will increase (or decrease) the mean score of the dependent variable by the unstandardized coefficient.

Accordingly, by taking both models into account, it is possible to quantitatively predict how a change to a driver influencing an employee's likelihood to recommend will impact an overall eNPS.

The following example illustrates the operation of this procedure. Starting with an eNPS of 5 for a company, one may wish to learn how changing the number of well-being programs offered to 6 and the frequency of participation to "Always" (value of 4) would be predicted to affect the company's eNPS.

In a first phase of the evaluation, the system would determine an impact of the change in the number of well-being programs and the frequency of participation on the average employee likelihood to recommend the company. To do this, the following steps may be taken.

Step 1. The prospective number of programs (here, 6) are compared to the average number of programs identified by the survey respondents (in this example, that may be 4.75). The result (1.25) will be used in step 2 of this process. In addition, the prospective frequency of participation (4) is compared to the average frequency of participation identified by the survey respondents (here, 2.66), leaving a result (1.34) that will also be used in step 2 of this process.

Step 2. The change in number of programs (1.25) is multiplied by the predetermined coefficient for the number of programs (here, that may be 0.04) to arrive at a new value, 0.05, which will be added to the mean likelihood to recommend score. Similarly, the change in frequency (1.34) is multiplied by the predetermined coefficient for frequency of participation (here, that may be 0.12) to arrive at a new value, 0.16, that can also be added to the mean likelihood to recommend score.

Step 3. A new mean likelihood to recommend score is calculated to be 7.33 (starting with an initial likelihood to recommend of 7.12, this comprises the addition of the values calculated in Step 2, i.e., 7.12+0.05+0.16=7.33)

In the second phase of the evaluation, the system would determine an impact of the change average employee likelihood to recommend the company on the expected eNPS score for the company. To do this, the following steps may be taken.

Step 4. The difference between the new mean score (7.33) and the original means core (7.12) is calculated. In this example, that difference is 0.21 (7.33-7.12=0.21) and reflects the total change in mean score for likelihood to recommend.

Step 5. Then, that difference is modified by the coefficient for the likelihood to recommend (which in this example may have been calculated as 14.53, to arrive at an expected change to the eNPS for the employer of 3.05 (0.21*12.53=3.05).

Step 6. Finally, the predicted eNPS from the prospective changes can be estimated. In this case, that would be a change from an original eNPS of 5 to a new eNPS of 8 (5+3.05=8.05, rounded to 8). In embodiments, a percentage change in eNPS is provided as opposed to a raw change in score.

Having thus described an example implementation at a high level, the following description provides more detail regarding various aspects of the present invention.

II. Computer Program Products, Methods, and Computing Entities

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like). A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), singl e in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

I. Exemplary System Architecture

FIG. 1 provides an illustration of an exemplary embodiment of the present disclosure. As shown in FIG. 1, this particular embodiment may include one or more management computing entities 100, one or more networks 105, and one or more user computing entities 110. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Management Computing Entity

Figure 2:
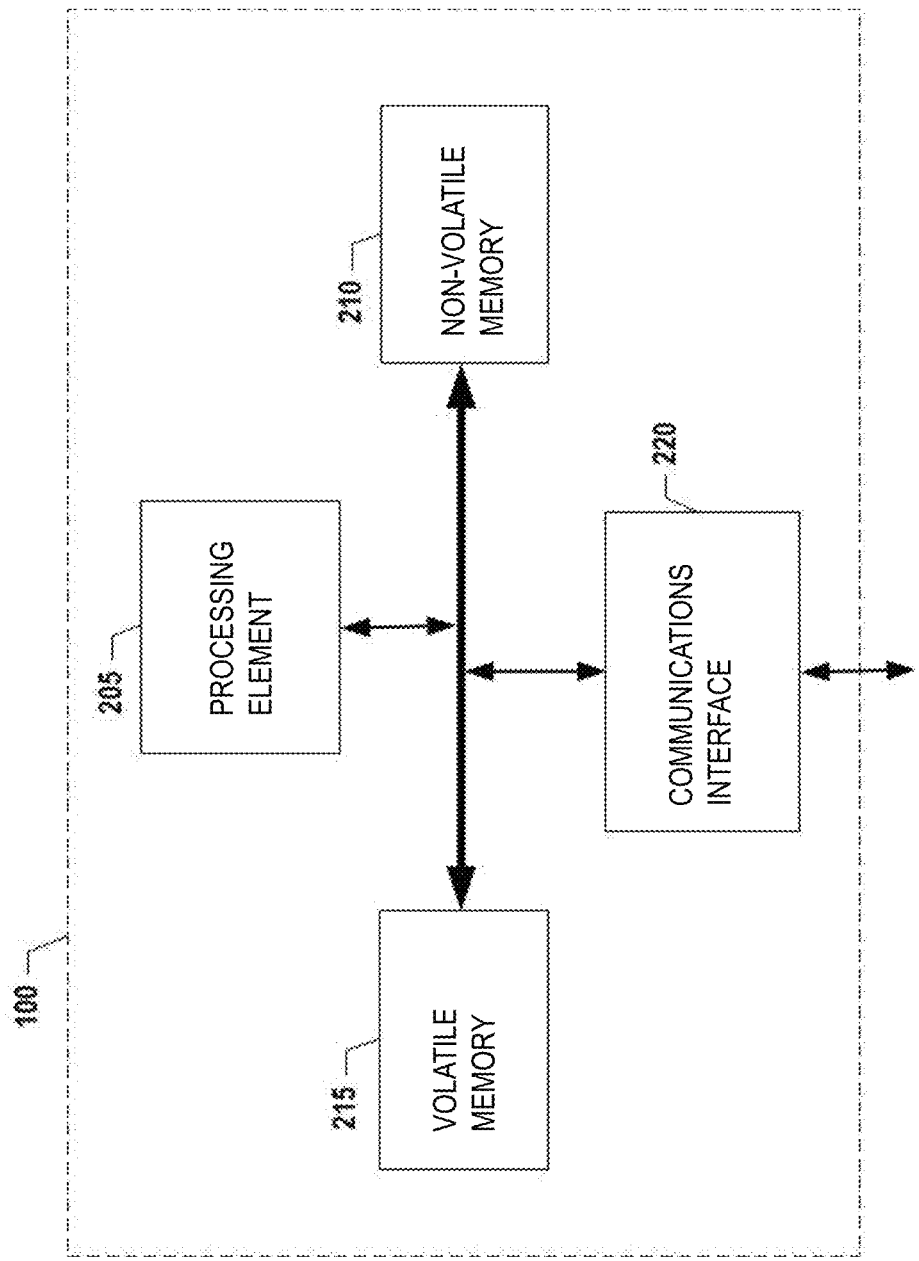

FIG. 2 provides a schematic of a management computing entity 100 according to one embodiment of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, wearable items, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the management computing entity 100 may include or be in communication with one or more processing elements 205 (also referred to as processors, processing circuitry, and/or similar terms used herein interchangeably) that communicate with other elements within the management computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the management computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 100 with the assistance of the processing element 205 and operating system.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the management computing entity 100 may include or be in communication with one or more input elements, such as a keyboard input, a mouse input, a touch screen/display input, motion input, movement input, audio input, pointing device input, joystick input, keypad input, and/or the like. The management computing entity 100 may also include or be in communication with one or more output elements (not shown), such as audio output, video output, screen/display output, motion output, movement output, and/or the like.

As will be appreciated, one or more of the management computing entity's 100 components may be located remotely from other management computing entity 100 components, such as in a distributed system. Furthermore, one or more of the components may be combined and additional components performing functions described herein may be included in the management computing entity 100. Thus, the management computing entity 100 can be adapted to accommodate a variety of needs and circumstances. As will be recognized, these architectures and descriptions are provided for exemplary purposes only and are not limiting to the various embodiments.

2. Exemplary User Computing Entity

Figure 3:
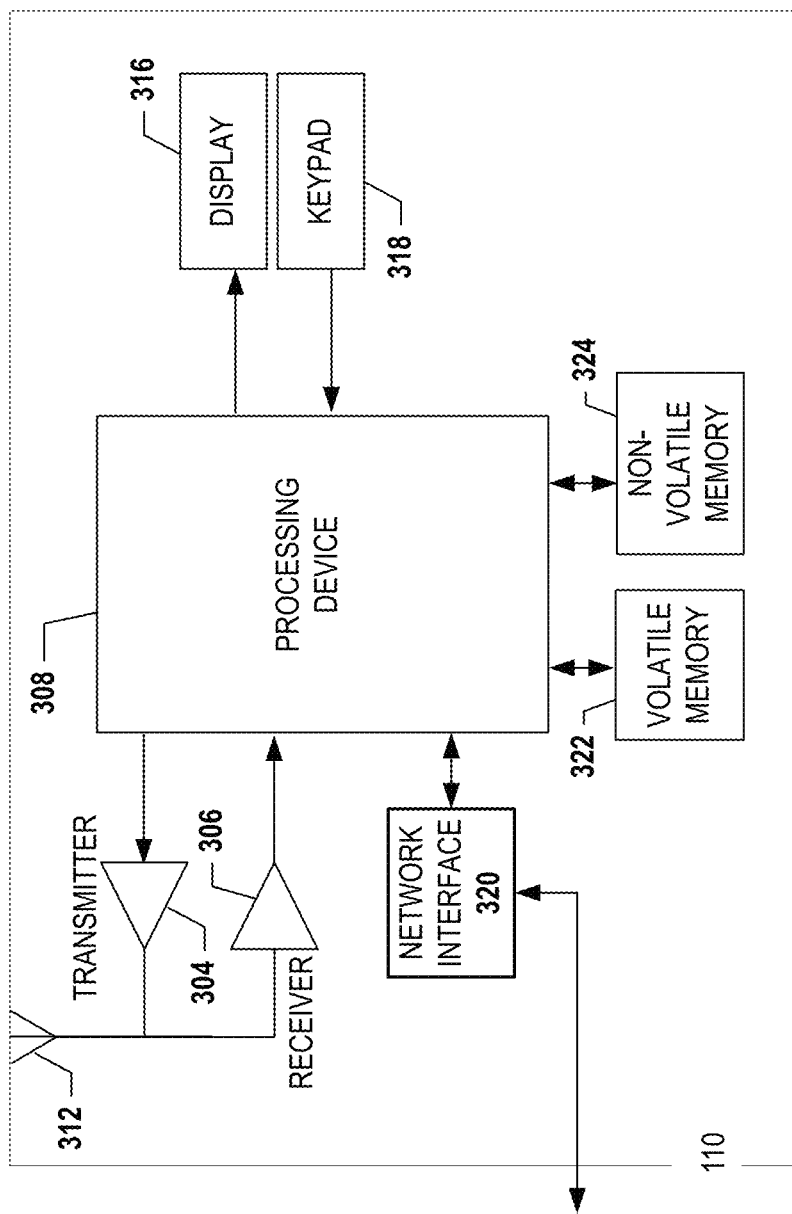

A user may be an individual, a family, a company, an organization, an entity, a department within an organization, a representative of an organization and/or person, and/or the like. A user may operate a user computing entity 110 that includes one or more components that are functionally similar to those of the management computing entity 100. FIG. 3 provides an illustrative schematic representative of a user computing entity 110 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, RFID tags, ear pieces, scanners, televisions, dongles, cameras, wristbands, wearable items, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 110 can be operated by various parties. As shown in FIG. 3, the user computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user computing entity 110 may be capable of operating with one or more air interface standards, communication protocols, modulation types, and access types. More particularly, the user computing entity 110 may operate in accordance with any of a number of wireless communication standards and protocols, such as those described above with regard to the management computing entity 100. In a particular embodiment, the user computing entity 110 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 110 may operate in accordance with multiple wired communication standards and protocols, such as those described above with regard to the management computing entity 100 via a network interface 320.

Via these communication standards and protocols, the user computing entity 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 110 can also download changes, add-ons, and updates, for instance, to its firmware, software (e.g., including executable instructions, applications, program modules), and operating system.

According to one embodiment, the user computing entity 110 may include location determining aspects, devices, modules, functionalities, and/or similar words used herein interchangeably. For example, the user computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the user computing entity's 110 position in connection with a variety of other systems, including cellular towers, Wi-Fi access points, and/or the like. Similarly, the user computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user computing entity 110 to interact with and/or cause display of information from the management computing entity 100, as described herein. The user input interface can comprise any of a number of devices or interfaces allowing the user computing entity 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 110. As indicated, this may include a user application that is resident on the entity or accessible through a browser or other user interface for communicating with the management computing entity 100 and/or various other computing entities.

In another embodiment, the user computing entity 110 may include one or more components or functionality that are the same or similar to those of the management computing entity 100, as described in greater detail above. As will be recognized, these architectures and descriptions are provided for exemplary purposes only and are not limiting to the various embodiments.

II. Exemplary Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices/entities, such as, for example, one or more servers, relays, routers, network access points, base stations, hosts, and/or the like, sometimes referred to herein as a "network." Similarly, where a computing device is described herein to transmit data to another computing device, it will be appreciated that the data may be sent directly to another computing device or may be sent indirectly via one or more intermediary computing devices/entities, such as, for example, one or more servers, relays, routers, network access points, base stations, hosts, and/or the like.

It should be appreciated that the term "programmatically expected" indicates machine prediction of occurrence of certain events.

As used herein, the term "likelihood" refers to a measure of probability for occurrence of a particular event.

The term "machine learning model" refers to a machine learning task. Machine learning is a method used to devise complex models and algorithms that lend themselves to prediction. A machine learning model is a computer-implemented algorithm that can learn from data without relying on rules-based programming. These models enable reliable, repeatable decisions and results and uncovering of hidden insights through machine-based learning from historical relationships and trends in the data.

A machine learning model is initially fit or trained on a training dataset (e.g., a set of examples used to fit the parameters of the model). The model can be trained on the training dataset using supervised or unsupervised learning. The model is run with the training dataset and produces a result, which is then compared with a target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). In some embodiments, the machine learning model is a regression model.

In embodiments disclosed herein, a regression model is applied to a training data set (e.g., employee net promoter score (eNPS) research data) to narrow a plurality of eNPS variables having influence on eNPS down to a subset that includes eNPS key driver variables. In embodiments, the regression model is a linear regression model.

In embodiments disclosed herein, data received from a user computing entity is applied to a trained machine learning model to predict an employee net promoter score (eNPS). As explained above, the following example illustrates the operation of this procedure.

Starting with an eNPS of 5 for a company, one may wish to learn how changing the number of well-being programs offered to 6 and the frequency of participation to "Always" (value of 4) would be predicted to affect the company's eNPS.

In a first phase of the evaluation, the system would determine an impact of the change in the number of well-being programs and the frequency of participation on the average employee likelihood to recommend the company. To do this, the following steps may be taken.

Step 1. The prospective number of programs (here, 6) are compared to the average number of programs identified by the survey respondents (in this example, that may be 4.75). The result (1.25) will be used in step 2 of this process. In addition, the prospective frequency of participation (4) is compared to the average frequency of participation identified by the survey respondents (here, 2.66), leaving a result (1.34) that will also be used in step 2 of this process.

Step 2. The change in number of programs (1.25) is multiplied by the predetermined coefficient for the number of programs (here, that may be 0.04) to arrive at a new value, 0.05, which will be added to the mean likelihood to recommend score. Similarly, the change in frequency (1.34) is multiplied by the predetermined coefficient for frequency of participation (here, that may be 0.12) to arrive at a new value, 0.16, that can also be added to the mean likelihood to recommend score.

Step 3. A new mean likelihood to recommend score is calculated to be 7.33 (starting with an initial likelihood to recommend of 7.12, this comprises the addition of the values calculated in Step 2, i.e., 7.12+0.05+0.16=7.33)

In the second phase of the evaluation, the system would determine an impact of the change average employee likelihood to recommend the company on the expected eNPS score for the company. To do this, the following steps may be taken.

Step 4. The difference between the new mean score (7.33) and the original means core (7.12) is calculated. In this example, that difference is 0.21 (7.33-7.12=0.21) and reflects the total change in mean score for likelihood to recommend.

Step 5. Then, that difference is modified by the coefficient for the likelihood to recommend (which in this example may have been calculated as 14.53, to arrive at an expected change to the eNPS for the employer of 3.05 (0.21*12.53=3.05).

Step 6. Finally, the predicted eNPS from the prospective changes can be estimated. In this case, that would be a change from an original eNPS of 5 to a new eNPS of 8 (5+3.05=8.05, rounded to 8).

The term "target variable" refers to a value that a machine learning model is designed to predict. In the present embodiments, historical data is used to train a machine learning model to predict the target variable. Historical observations of the target variable are used for such training.

The terms "dataset" and "data set" refer to a collection of data. A data set can correspond to the contents of a single database table, or a single statistical data matrix, where every column of the table represents a particular variable, and each row corresponds to a given member of the data set in question. The data set can be comprised of tuples.

The term "employer" refers to a person or institution that hires employees or provides employment to employees. Employment is a relationship between an employer and an employee, usually based on a contract where work is paid for. The person or institution that hires employees may be a corporation, for profit, not for profit organization, co-operative or other entity.

The term "employee" refers to a person or entity that works in return for payment, which may be in the form of an hourly wage, by piecework or an annual salary, depending on the type of work an employee does or which industry or sector the employee is working in. An employee contributes labor and expertise to an endeavor of an employer or of a person conducting a business or undertaking and is usually hired to perform specific duties which are packaged into a job. In a corporate context, an employee is a person who is hired to provide services to a company on a regular basis in exchange for compensation and who does not provide these services as part of an independent business.

The term "predictive adjustment" refers to the use of machine learning to provide an adjusted representation of overall employee engagement.

The term "employee net promoter score (eNPS)" refers to an index ranging from −100 to 100 that represents a willingness of employees employed by an employer to recommend the employer to others (i.e., make a favorable recommendation action with respect to the employer).

The term "employee net promoter score (eNPS) research data" refers to a set of data representing research conducted regarding the calculation of employee net promoter score (eNPS). The employee net promoter score (eNPS) research data is representative of a plurality of variables, where each variable of the plurality of variables comprises a driver of the employee net promoter score (eNPS). In some examples, the employee net promoter score (eNPS) research data is collected from a statistically significant number of survey respondents. In implementation, the eNPS research data comprised survey respondents of 1200 individuals. Some variables of the plurality of variables that were identified as affecting the eNPS in some situations include those listed in Table 1 below.

In embodiments, other key drivers of eNPS include one or more of "I'm proud to be part of my company," "If given the chance, I would re-apply for my current job," "I am enthusiastic about my future with my employer," "My employer promotes positive relationships between co-workers," "Satisfaction with workload," "Satisfaction with job security," and "Satisfaction with opportunities for advancement/promotion."

TABLE 1

Exemplary Variables Represented by Employee Net Promoter Score (eNPS) Research Data

| Variable | Description | Variable Options |
|---|---|---|
| Employee Well-Being Programs | Resources made available by employers to employees to manage and improve employee health, happiness, productivity, and overall well-being | Programs and services that help employees get healthy; Programs and services that help employees navigate the health care system; Programs and services that help employees optimize their mental health; Programs and services that help employees stay healthy and prevent illness; Tools that help employees assess their health and gain health knowledge; Programs and services that help employees manage a chronic condition: disease management, case management; A physical work environment that supports healthy decisions during the workday; A program or service that helps employees get the most value from their prescription drug plan. |
| Employee Participation Frequency | The frequency of employee participation in those employee well-being programs made available by an employer | Always/as often as possible; Frequently; Occasionally; Rarely |

The term "driver of employee net promoter score (eNPS)" refers to a variable or metric that is identified as having influence on an employee net promoter score (eNPS). In some examples, the driver of employee net promoter score (eNPS) is selected from the exemplary variables depicted in Table 1

The term "eNPS key driver variable" refers to a variable that is identified as having more influence on an employee net promoter score (eNPS) than other variables. In some examples, the eNPS key driver variable is selected from the exemplary variables depicted in Table 1. In some examples, multiple eNPS key driver variables can be identified (e.g., the top two eNPS key driver variables are selected from all variables and are identified as being the top two influencers of eNPS having the most influence in comparison to the other variables).

The term "an initial employee net promoter score (eNPS)" refers to a self-selected (e.g., provided by an employer) index ranging from −100 to 100 that represents a willingness of employees employed by an employer to recommend the employer to others (i.e., make a favorable recommendation action with respect to the employer). In some embodiments, the initial employee net promoter score (eNPS) is provided by a user computing entity via an interface provided by a management computing entity. An exemplary interface for receiving an initial employee net promoter score (eNPS) from a user computing entity is depicted in FIG. 7E.

For example, the first eNPS key driver variable can be identified as Employee Well-Being Programs as defined in Table 1. In such an example, the first eNPS key driver variable options are defined as the options associated with Employee Well-Being Programs as defined in Table 1. The first data comprising one or more selections of first eNPS key driver variable options can be a selection of two programs: Programs and services that help employees get healthy; and Programs and services that help employees navigate the health care system. An exemplary interface depicting such an example is provided in FIGS. 7F and 7G.

In the example, the second eNPS key driver variable can be identified as Employee Participation Frequency as defined in Table 1. In such an example, the second eNPS key driver variable options are defined as the options associated with Employee Participation Frequency in Table 1. The second data comprising an original selection of a second eNPS key driver variable can be a selection of a frequency: Occasionally. An exemplary interface depicting such an example is provided in FIG. 7H.

An exemplary interface presenting a depiction of how an employee net promoter score (eNPS) can be changed is depicted in FIG. 7I.

The term "adjusted employee net promoter score (eNPS)" refers to a programmatically generated (e.g., using a model) index ranging from −100 to 100 that represents a willingness of employees employed by an employer to recommend the employer to others (i.e., make a favorable recommendation action with respect to the employer). In some embodiments, the adjusted employee net promoter score (eNPS) is programmatically generated based upon third data comprising one or more additional selections of first eNPS key driver variable options from a plurality of first eNPS key driver variable options, fourth data comprising an additional selection of a second eNPS key driver variable option from a plurality of second eNPS key driver variable options, and an initial employee net promoter score (eNPS). In embodiments, the additional selection of the second eNPS key driver variable option is different in comparison to the original selection of the second eNPS key driver variable option. An exemplary interface depicting the presentation of an adjusted employee net promoter score (eNPS) is provided in FIG. 7M.

In embodiments, types of models used for programmatically generating the adjusted employee net promoter score (eNPS) may include various statistical and/or machine learning models. In an example embodiment, the model comprises a regression model.

Continuing the example described above, the one or more additional selections of first eNPS key driver variable options from a plurality of first eNPS key driver variable options can be a selection of four additional programs: Programs and services that help employees optimize their mental health; Tools that help employees assess their health and gain health knowledge; Programs and services that help employees manage a chronic condition: disease management, case management; and A physical work environment that supports healthy decisions during the workday. An exemplary interface depicting such an example is provided in FIGS. 7J and 7K.

In the example, the second eNPS key driver variable can be identified as Employee Participation Frequency as defined in Table 1. In such an example, the second eNPS key driver variable options are defined as the options associated with the additional selection of the second eNPS key driver variable option that is different in comparison to the original selection of the second eNPS key driver variable option can be: Always/as often as possible. The adjusted employee net promoter score (eNPS) is programmatically generated, in this example, using the total of six Employee Well-Being Programs and the frequency of Always/as often as possible. An exemplary interface depicting such an example is provided in FIG. 7L.

The terms "influencing" or "influence" refer to a variable's ability to cause change in an employee net promoter score (eNPS). In some examples, a variable having influence over an employee net promoter score (eNPS) is an independent variable while the employee net promoter score (eNPS) is a dependent variable.

The term "variable options" refers to data representing multiple features associated with a variable, examples of which are depicted in Table 1.

The term "original selection" refers to a first selection from variable options associated with a variable that is provided by a user computing entity. In some examples, an original selection can be thought of as a starting point within the variable options.

The term "additional selection" refers to a selection from variable options associated with a variable that is subsequent to an original selection, where both the additional selection and the original selection are provided by a user computing entity. In some examples, the additional selection represents a changed selection in variable options over the original selection. It will be appreciated that the additional selection can be a subsequent selection of the same variable option as selected in the original selection without departing from the scope of the present disclosure.

The term "employee well-being programs" refers to resources made available by employers to employees to manage and improve employee health, happiness, productivity, and overall well-being. Non-limiting examples of employee well-being programs are depicted in Table 1.

The term "employee participation frequency" refers to a frequency of employee participation in those employee well-being programs made available by an employer. Non-limiting examples of employee well-being programs are depicted in Table 1.

The term "favorable recommendation action" refers to an action taken by an employee that represents the employee recommending an employer to others. In embodiments, the favorable recommendation action is performed electronically or not electronically.

IV. Exemplary System Operation

Employee net promoter score (eNPS) is a complex mathematical calculation that is resource intensive from a computing standpoint. The inventors have determined that generating, understanding, and making use of an employee net promoter score (eNPS) leads to an exhaustion of computing storage resources as well as an increase computing processor time and load imbalance. The present disclosure provides a viable calculator that allows an employer to understand the impact on employee net promoter score (eNPS) based on changes to investments in employee well-being programs, and employee participation in employee well-being programs, while optimally balancing and conserving computing resources. The model provided herein predicts changes to the employee net promoter score (eNPS) based on the expected likelihood that an employee will make a favorable recommendation action. The present disclosure utilizes a vast amount of data and advanced analytics to establish a connection between investment in employee well-being and employee net promoter score (eNPS).

Figure 4:
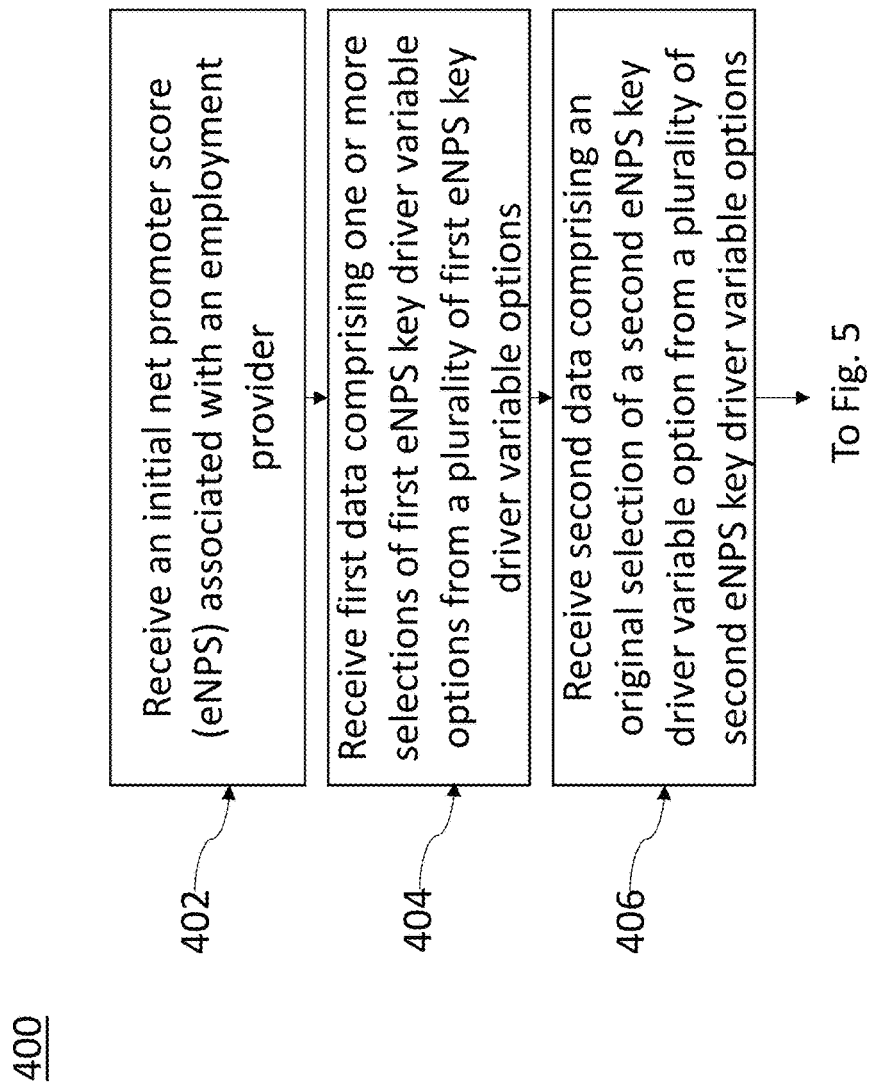
FIG. 4 illustrates an exemplary initial employee net promoter score (eNPS) intake process for use with embodiments of the present disclosure.

FIG. 4 illustrates an exemplary initial eNPS intake process for use with embodiments of the present disclosure. In embodiments, an exemplary process 400 begins with receiving, from a user computing entity, an initial employee net promoter score (eNPS) 402 associated with an employer.

Process 400 continues with receiving first data from the user computing entity 404. In embodiments, the first data comprises one or more selections of first eNPS key driver variable options from a plurality of first eNPS key driver variable options. In embodiments, examples of the plurality of first eNPS key driver variables are depicted in Table 1.

Process 400 continues with receiving second data from the user computing entity 406. In embodiments, the second data comprises an original selection of a second eNPS key driver variable option from a plurality of second eNPS key driver variable options. In embodiments, examples of the plurality of second eNPS key driver variables are depicted in Table 1. Process 400 continues on to the exemplary steps depicted in FIG. 5.

Figure 5:
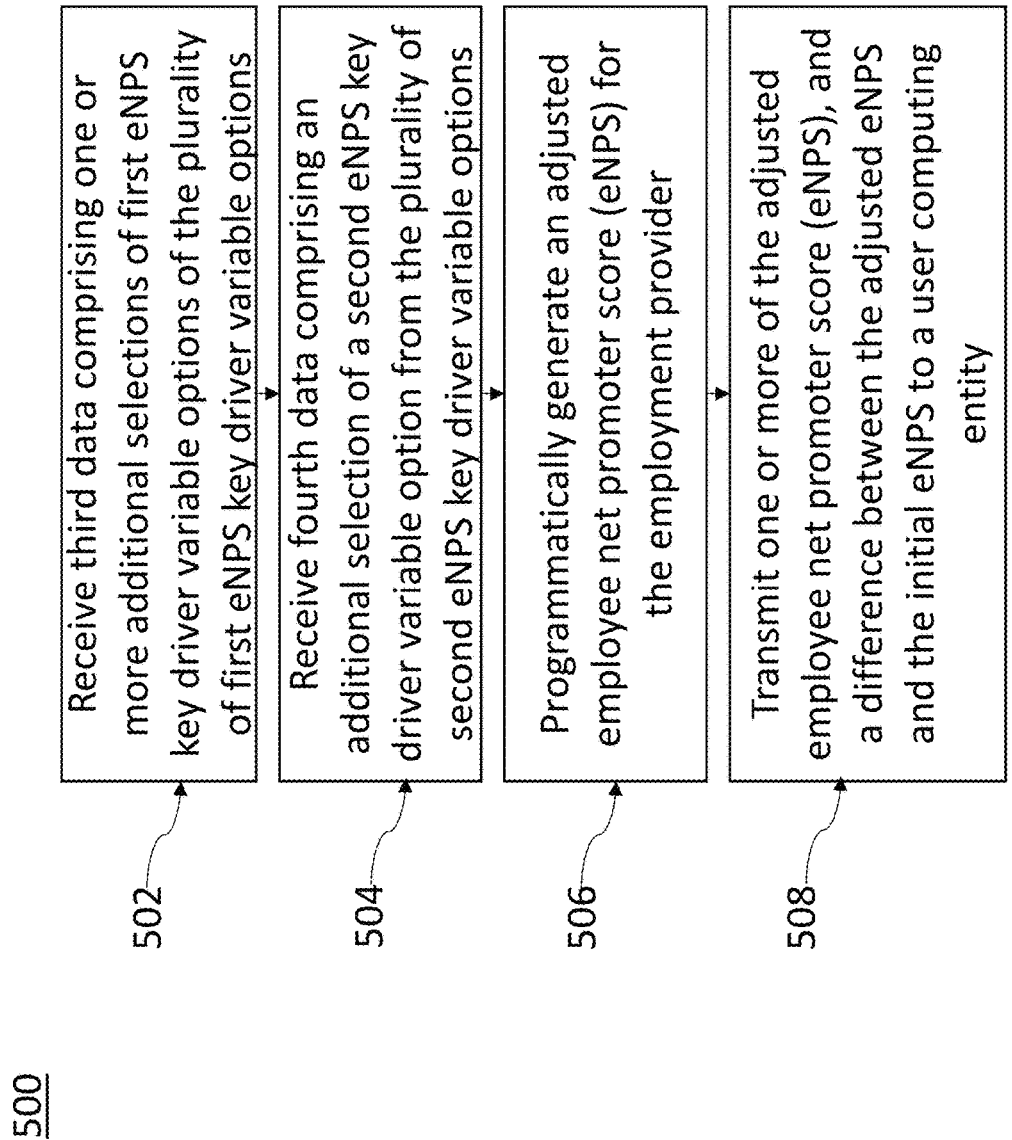
FIG. 5 illustrates an exemplary predictive adjusted employee net score (eNPS) calculation process for use with embodiments of the present disclosure.

FIG. 5 illustrates an exemplary predictive adjusted employee net score (eNPS) calculation process for use with embodiments of the present disclosure. In embodiments, a process 500 is a continuation of process 400 and begins with receiving third data from the user computing entity 502. In embodiments, the third data comprises one or more additional selections of first eNPS key driver variable options of the plurality of first eNPS key driver variable options.

Process 500 continues with receiving fourth data from the user computing entity 504. In embodiments, the fourth data comprises an additional selection of a second eNPS key driver variable option from the plurality of second eNPS key driver variable options. In embodiments, the additional selection of the second eNPS key driver variable option is different in comparison to the original selection of the second eNPS key driver variable option.

Process 500 continues with programmatically generating an adjusted employee net promoter score (eNPS) for the employer using the machine learning model 506. In embodiments, the adjusted employee net promoter score (eNPS) is based at least on the initial employee net promoter score (eNPS) for the employer, the first data, the second data, the third data, and the fourth data.

Process 500 continues with transmitting one or more of the adjusted employee net promoter score (eNPS) for the employer, and a difference between the initial employee net promoter score (eNPS) and the adjusted employee net promoter score (eNPS) to the user computing entity 508.

In embodiments, the adjusted employee net promoter score (eNPS) for the employer represents a programmatically generated quantification of employee engagement.

In embodiments, the adjusted employee net promoter score (eNPS) is different from the initial employee net promoter score (eNPS).

Figure 6:
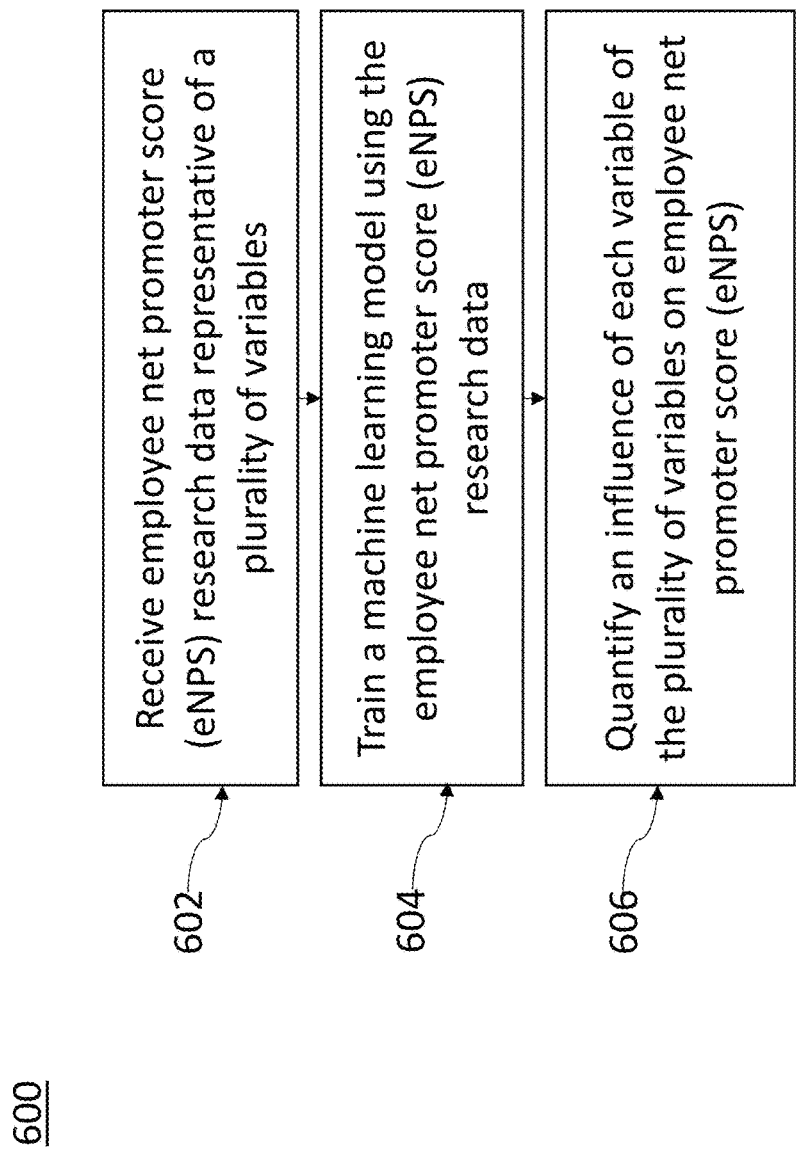
FIG. 6 illustrates an exemplary predictive eNPS key driver variable determination process for use with embodiments of the present disclosure.

FIG. 6 illustrates an exemplary predictive eNPS key driver variable determination process for use with embodiments of the present disclosure. In embodiments, a process 600 begins with receiving employee net promoter score (eNPS) research data representative of a plurality of variables 602. In embodiments, each variable of the plurality of variables represents a driver of the employee net promoter score (eNPS).

Process 600 continues with training the machine learning model using the employee net promoter score (eNPS) research data 604 and quantifying an influence of each variable of the plurality of variables 604 on employee net promoter score (eNPS). In embodiments, the first eNPS key driver variable and the second eNPS key driver variable are selected based on the quantified influence each has on employee net promoter score (eNPS).

In embodiments, the first eNPS key driver variable represents a number of employee well-being programs the employer offered to employees.

In embodiments, the second eNPS key driver variable represents an employee participation frequency in the number of employee well-being programs.

Figure 7A:
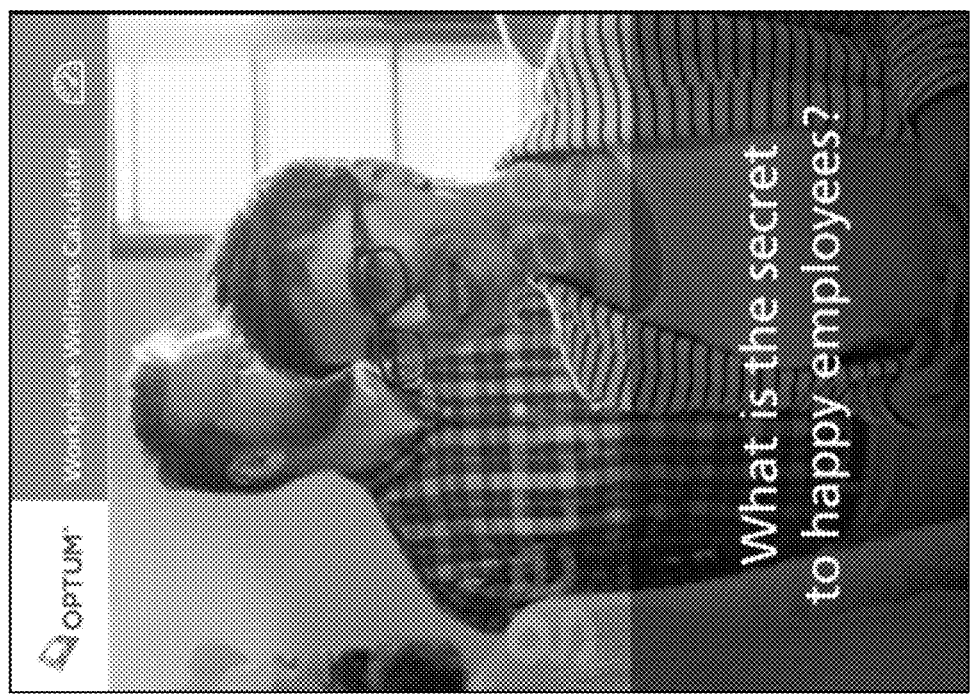
FIGS. 7A-7N illustrate exemplary interfaces for use with embodiments of the present disclosure.
Figure 7B:
Figure 7C:
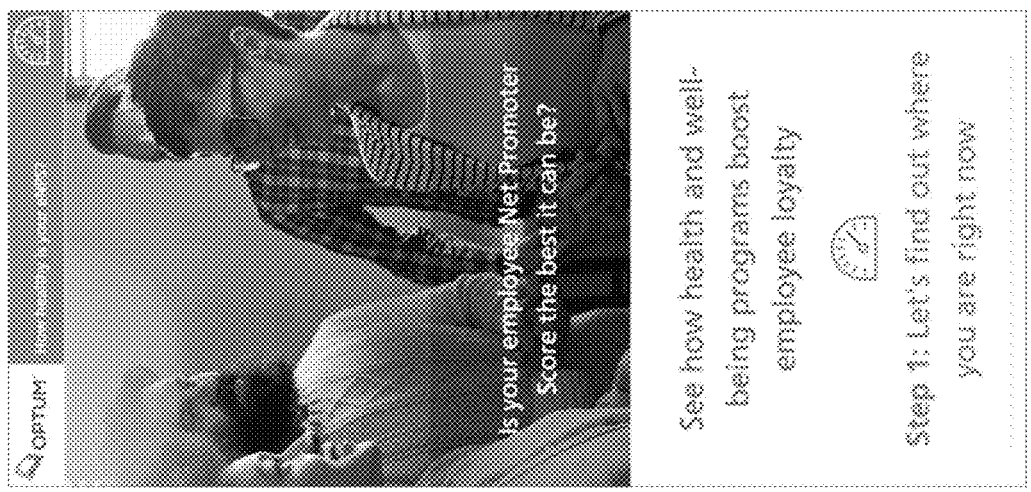
Figure 7D:
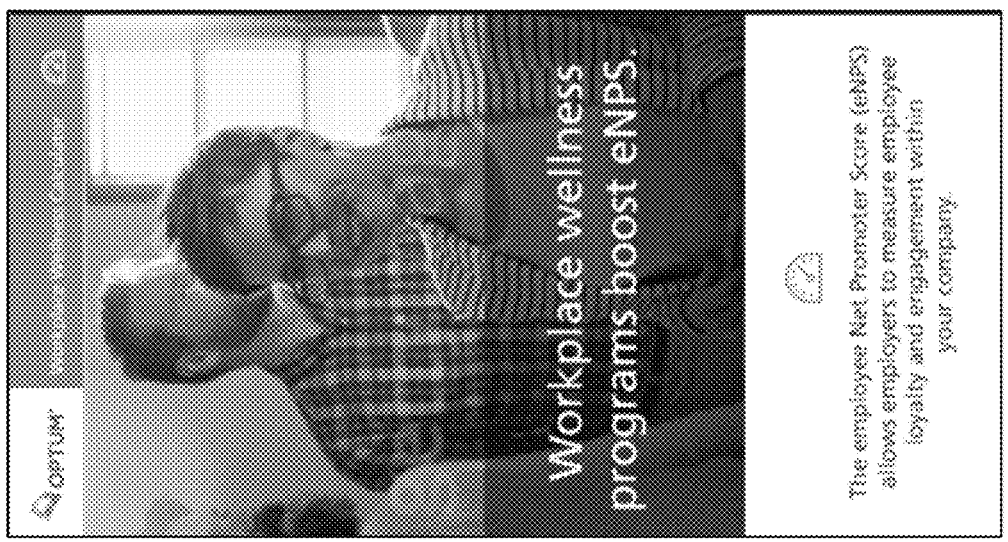
Figure 7E:
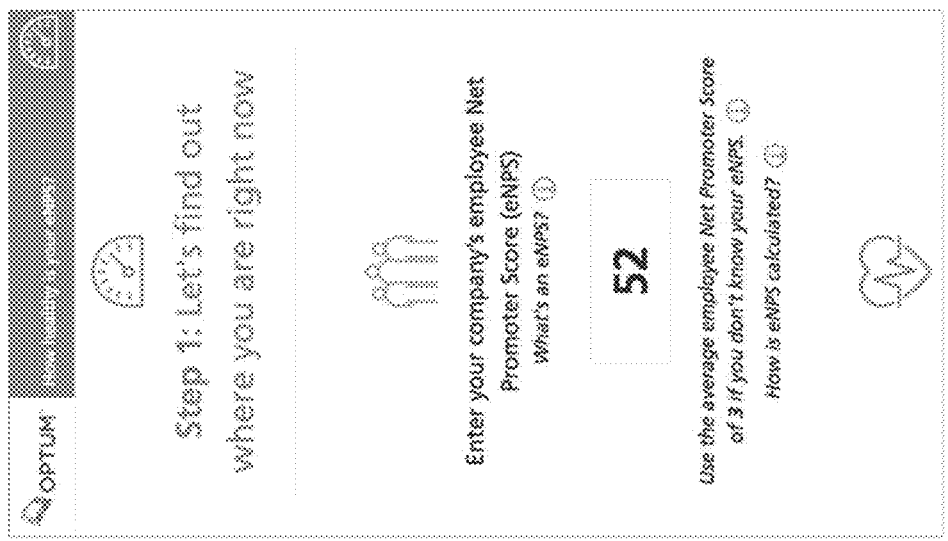
Figure 7F:
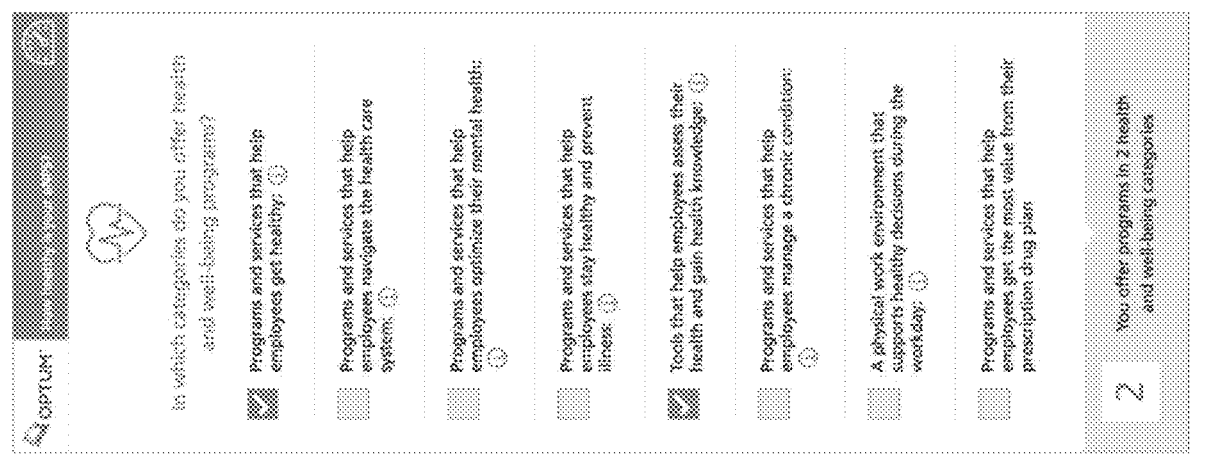
Figure 7G:
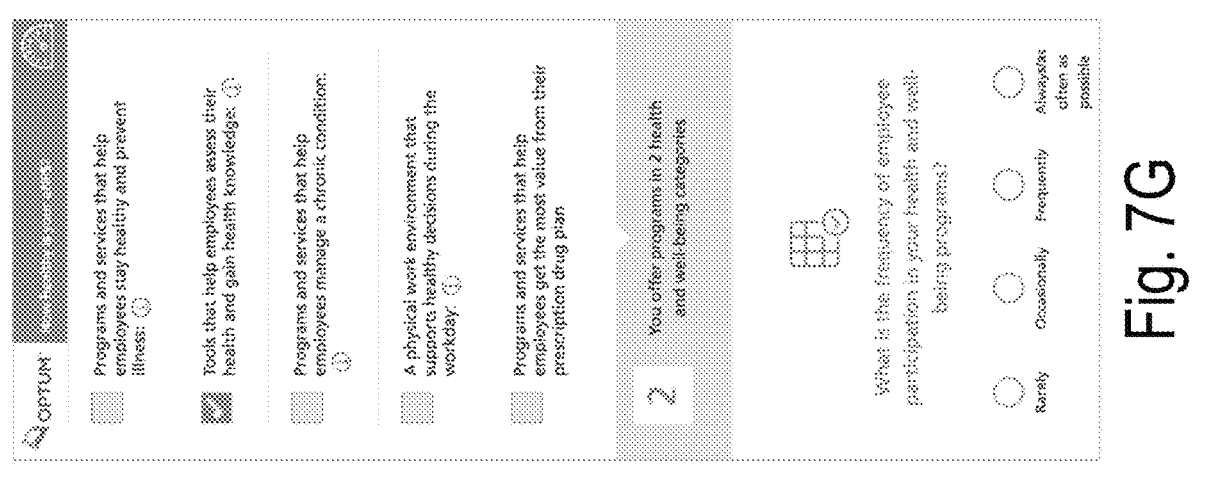
Figure 7H:
Figure 71:
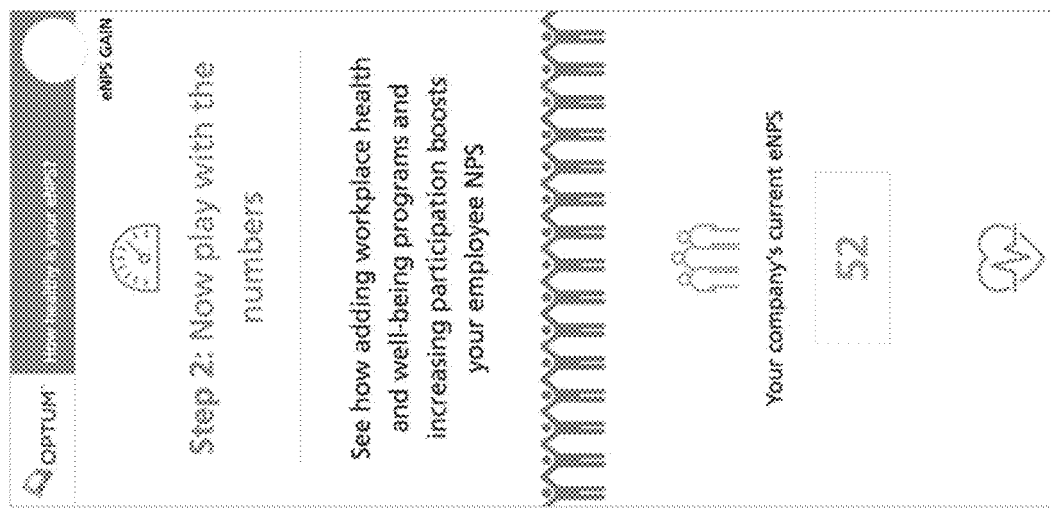
Figure 7J:
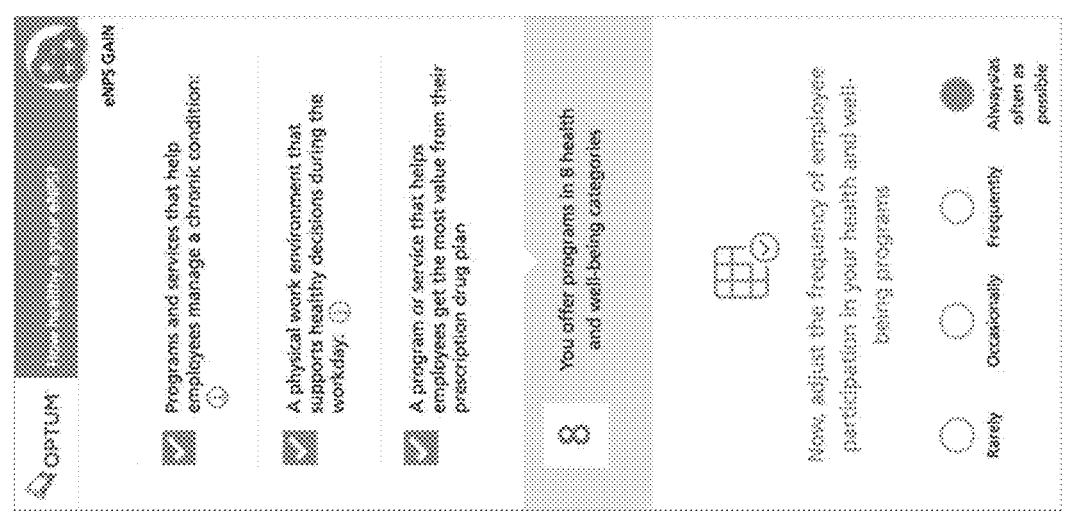
Figure 7K:
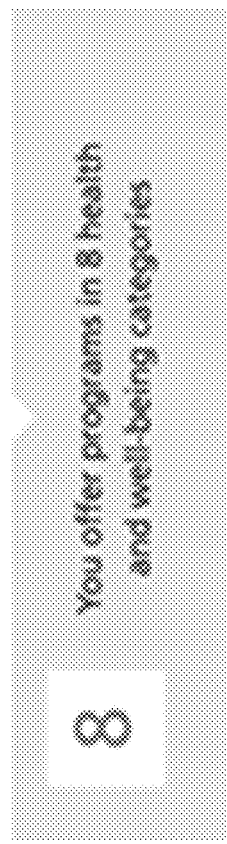
Figure 7L:
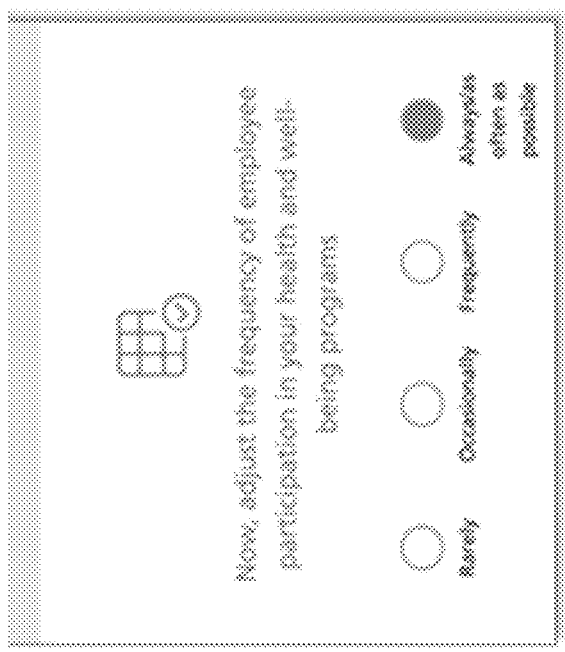
Figure 7M:
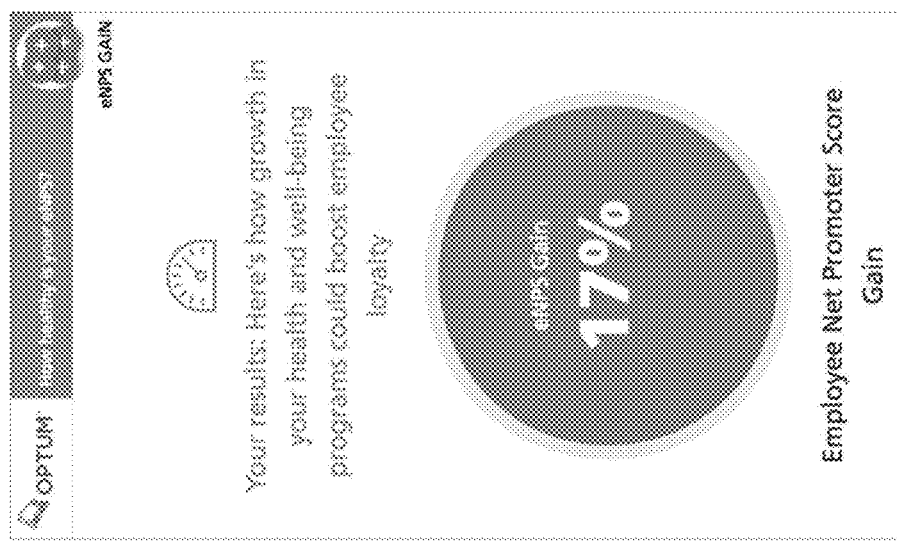
Figure 7N:
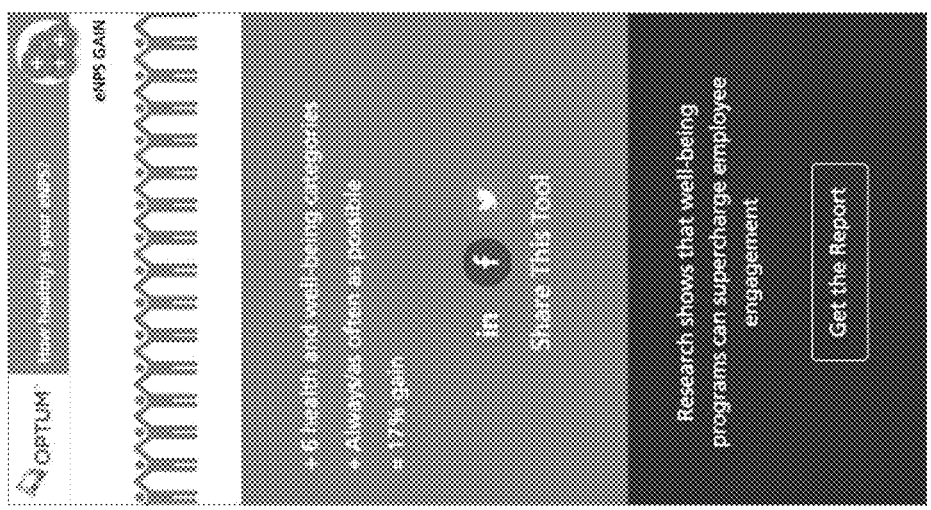

FIGS. 7A-7N illustrate exemplary interfaces for use with embodiments of the present disclosure. In embodiments, interfaces depicted in FIGS. 7A-7D provide an understanding of employee net promoter score (eNPS). In embodiments, the interface depicted in FIG. 7N provides additional information related to employee net promoter score (eNPS).

The interfaces depicted in FIGS. 7E-7N depict graphical representations of exemplary interactions between a user computing entity and a management computing entity as disclosed herein.

V. Conclusion

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. An apparatus comprising one or more processors and memory including computer program code, the memory and the computer program code configured to, with the one or more processors, cause the apparatus to:
    receive employee net promotor score (eNPS) survey data, wherein the eNPS survey data comprises (i) a response to an eNPS primary question associated with an employer, and (ii) a plurality of responses to respective secondary questions corresponding to a variable of a plurality of variables the response to the eNPS primary question;
    determine, based at least in part on the eNPS survey data and using a predictive model, an influence measure for each of the plurality of variables on an eNPS for the employer, wherein (a) the influence measure quantifies a relationship among the response to the eNPS primary question and the responses to the secondary questions, and (b) the predictive model is generated based at least in part on eNPS research data representative of the plurality of variables;
    transmit to a user computing device, an initial presentation, wherein (a) the initial presentation is displayable by an interactive user interface of the user computing device, (b) the user computing device is configured to receive an initial eNPS for the employer via initial interactions, and (c) the initial eNPS represents a self-selected index representing a willingness of employees employed by the employer to make a favorable recommendation action with respect to the employer;
    receive, originating from the user computing device, the initial eNPS;
    receive, originating from the user computing device, a first selection, wherein (a) the user computing device is configured to receive the first selection via first interactions with a first presentation displayed by the interactive user interface, (b) the first selection comprises one or more first eNPS key driver variable options of a plurality of first eNPS key driver variable options displayed via the first presentation, and (c) each of the plurality first eNPS key driver variable options (i) represents a unique employee well-being program of a plurality of employee well-being programs and (ii) is identified as having a comparatively higher influence on the eNPS than other variables of the plurality of variables;
    receive, originating from the user computing device, a second selection, wherein (a) the user computing device is configured to receive the second selection via second interactions with a second presentation displayed by the interactive user interface, (b) the second selection comprises a second eNPS key driver variable option of a plurality of second eNPS key driver variable options displayed via the second presentation, (c) each of the plurality of second eNPS key driver variable options represents a unique level of employee participation frequency of a plurality of levels of employee participation frequency, and (d) the unique level of employee participation frequency is associated with the unique employee well-being program;
    receive, originating from the user computing device, a third selection, wherein (a) the user computing device is configured to receive the third selection via third interactions with a third presentation displayed by the interactive user interface, (b) the third selection comprises one or more additional first eNPS key driver variable options of the plurality of first eNPS key driver variable options displayed via the third presentation, and (c) each of the one or more additional first eNPS key driver variable options is different from the one or more first eNPS key driver variable options;
    receive, originating from the user computing device, a fourth selection, wherein (a) the user computing device is configured to receive the fourth selection via fourth interactions with a fourth presentation displayed by the interactive user interface, (b) the fourth selection comprises one or more additional second eNPS key driver variable options of the plurality of second eNPS key driver variable options displayed via the fourth presentation, and (c) each of the one or more additional second eNPS key driver variable options is different from the second eNPS key driver variable option;
    generate, using a trained machine learning model, a prediction for an adjusted eNPS for the employer, wherein (a) the adjusted eNPS is based at least in part on the initial eNPS for the employer, the first selection, the second selection, the third selection, and the fourth selection, and (b) the adjusted eNPS represents a likelihood that the employees employed by the employer will make the favorable recommendation action with respect to the employer; and transmit, to the user computing device, a sixth presentation, causing the interactive user interface to display the sixth presentation, wherein the sixth presentation comprises at least one of the adjusted eNPS or an indication of a difference between the initial eNPS and the adjusted eNPS.

2. The apparatus of claim 1, wherein
each influence measure narrows the plurality of variables down to a subset that comprises eNPS key driver variables representing those variables of the plurality of variables having a higher influence on the eNPS than other variables of the plurality of variables.

3. The apparatus of claim 1, wherein the adjusted eNPS is an index ranging from −100 to 100.

4. The apparatus of claim 1, wherein the adjusted eNPS is different from the initial eNPS.

5. The apparatus of claim 1, wherein the memory and the computer program code configured to, with the one or more processors, further cause the apparatus to:
receive, originating from the user computing entity and via sixth interactions by the user computing entity with a seventh interface configured for rendering via the display device, an employer industry selection and a number of employees of the employer, wherein programmatically generating the adjusted eNPS score takes into account the employer industry selection and the number of employees of the employer.

6. The apparatus of claim 2, wherein the memory and the computer program code configured to, with the one or more processors, further cause the apparatus to:
quantify an influence by a first eNPS key driver variable associated with a first eNPS key driver variable option of the first selection and a second eNPS key driver variable associated with the second eNPS key driver variable option of the second selection on eNPS.

7. A system comprising server having one or more processors and memory including computer program code, the memory and the computer program code configured to, with the one or more processors, cause the system to:
receive employee net promotor score (eNPS) survey data, wherein the eNPS survey data comprises (i) a response to an eNPS primary question associated with an employer, and (ii) a plurality of responses to respective secondary questions corresponding to a variable of a plurality of variables affecting the response to the eNPS primary question;
determine, based at least in part on the eNPS survey data and using a predictive model, an influence measure for each of the plurality of variables on an eNPS for the employer, wherein (a) the influence measure quantifies a relationship among the response to the eNPS primary question and the responses to the secondary questions, and (b) the predictive model is generated based at least in part on eNPS research data representative of the plurality of variables;
transmit to a user computing device, an initial presentation, wherein (a) the initial presentation is displayable by an interactive user interface of the user computing device, (b) the user computing device is configured to receive an initial eNPS for the employer via initial interactions, and (c) the initial eNPS represents a self-selected index representing a willingness of employees employed by the employer to make a favorable recommendation action with respect to the employer;
receive, originating from the user computing device, the initial eNPS;
receive, originating from the user computing device, a first selection, wherein (a) the user computing device is configured to receive the first selection via first interactions with a first presentation displayed by the interactive user interface, (b) the first selection comprises one or more first eNPS key driver variable options of a plurality of first eNPS key driver variable options displayed via the first presentation, and (c) each of the plurality of first eNPS key driver variable options (i) represents a unique employee well-being program of a plurality of employee well-being programs and (ii) is identified as having a comparatively higher influence on the eNPS than other variables of the plurality of variables;
receive, originating from the user computing device, a second selection, wherein (a) the user computing device is configured to receive the second selection via second interactions with a second presentation displayed by the interactive user interface, (b) the second selection comprises a second eNPS key driver variable option of a plurality of second eNPS key driver variable options displayed via the second presentation, (c) each of the plurality of second eNPS key driver variable options represents a unique level of employee participation frequency of a plurality of levels of employee participation frequency, and (d) the unique level of employee participation frequency is associated with the unique employee well-being program;
receive, originating from the user computing device, a third selection, wherein (a) the user computing device is configured to receive the third selection via third interactions with a third presentation displayed by the interactive user interface, (b) the third selection comprises one or more additional first eNPS key driver variable options of the plurality of first eNPS key driver variable options displayed via the third presentation, and (c) each of the one or more additional first eNPS key driver variable options is different from the one or more first eNPS key driver variable options;
receive, originating from the user computing device, a fourth selection, wherein (a) the user computing device is configured to receive the fourth selection via fourth interactions with a fourth presentation displayed by the interactive user interface, (b) the fourth selection comprises one or more additional second eNPS key driver variable options of the plurality of second eNPS key driver variable options displayed via the fourth presentation, and (c) each of the one or more additional second eNPS key driver variable options is different from the second eNPS key driver variable option;
generate, using a trained machine learning model, a prediction for an adjusted eNPS for the employer, wherein (a) the adjusted eNPS is based at least in part on the initial eNPS for the employer, the first selection, the second selection, the third selection, and the fourth selection, and (b) the adjusted eNPS represents a likelihood that the employees employed by the employer will make the favorable recommendation action with respect to the employer; and
transmit, to the user computing device, a sixth presentation, causing the interactive user interface to display the sixth presentation, wherein the sixth presentation comprises at least one of the adjusted eNPS or an indication of a difference between the initial eNPS and the adjusted eNPS.

8. The system of claim 7, wherein each influence measure narrows the plurality of variables down to a subset that includes eNPS key driver variables representing those variables of the plurality of variables having a higher influence on the eNPS than other variables of the plurality of variables.

9. The system of claim 7, wherein the adjusted eNPS is an index ranging from −100 to 100.

10. The system of claim 7, wherein the adjusted eNPS is different from the initial employee net promoter score.

11. The system of claim 8, further caused to:
quantify an influence by a first eNPS key driver variable associated with a first eNPS key driver variable option of the first selection and a second eNPS key driver variable associated with the second eNPS key driver variable option of the second selection on eNPS.

12. The system of claim 8, wherein the adjusted eNPS for the employer represents a programmatically generated quantification of sentiment toward the employer by employees of the employer.

13. A computer-implemented method comprising:
receiving, by one or more processors, employee net promoter score (eNPS) survey data, wherein the eNPS survey data comprises (i) a response to an eNPS primary question associated with an employer and (ii) a plurality of responses to respective secondary questions, each of the secondary questions corresponding to a variable of a plurality of variables affecting the response to the eNPS primary question;
determining, by the one or more processors and using a predictive model, an influence measure for each of the plurality of variables on the eNPS for the employer, wherein (a) the influence measure quantifies a relationship among the responses to the eNPS primary question and the responses to the secondary questions, and (b) the predictive model is generated based at least in part on eNPS research data representative of the plurality of variables;
transmitting, by the one or more processors and to a user computing device, an initial presentation, wherein (a) the initial presentation is displayable by an interactive user interface of the user computing device, (b) the user computing device is configured to receive an initial eNPS for the employer via initial interactions, and (c) the initial eNPS represents a self-selected index representing a willingness of employees employed by the employer to make a favorable recommendation action with respect to the employer;
receiving, by the one or more processors originating from the user computing device, the initial eNPS;
receiving, by the one or more processors originating from the user computing device, a first selection, wherein (a) the user computing device is configured to receive the first selection via first interactions with a first presentation displayed by the interactive user interface, (b) the first selection comprises one or more first eNPS key driver variable options of a plurality of first eNPS key driver variable options displayed via the first presentation, and (c) each of the plurality of first eNPS key driver variable options (i) represents a unique employee well-being program of a plurality of employee well-being programs and (ii) is identified as having a comparatively higher influence on the eNPS than other variables of the plurality of variables;
receiving, by the one or more processors originating from the user computing device, a second selection, wherein (a) the user computing device is configured to receive the second selection via second interactions with a second presentation displayed by the interactive user interface, (b) the second selection comprises a second eNPS key driver variable option of a plurality of second eNPS key driver variable options displayed via the second presentation, (c) each of the plurality of second eNPS key driver variable options represents a unique level of employee participation frequency of a plurality of levels of employee participation frequency, and (d) the unique level of employee participation frequency is associated with the unique employee well-being program;
receiving, by the one or more processors originating from the user computing device, a third selection, wherein (a) the user computing device is configured to receive the third selection via third interactions with a third presentation displayed by the interactive user interface, (b) the third selection comprises one or more additional first eNPS key driver variable options of the plurality of first eNPS key driver variable options displayed via the third presentation, and (c) each of the one or more additional first eNPS key driver variable options is different from the one or more first eNPS key driver variable options;
receiving, by the one or more processors originating from the user computing device, a fourth selection, wherein (a) the user computing device is configured to receive the fourth selection via fourth interactions with a fourth presentation displayed by the interactive user interface, (b) the fourth selection comprises one or more additional second eNPS key driver variable options of the plurality of second eNPS key driver variable options displayed via the fourth presentation, and (c) each of the one or more additional second eNPS key driver variable options is different from the second eNPS key driver variable option;
generating, by the one or more processors and using a trained machine learning model, a prediction for an adjusted eNPS for the employer, wherein (a) the adjusted eNPS is based at least in part on the initial eNPS for the employer, the first selection, the second selection, the third selection, and the fourth selection, and (b) the adjusted eNPS represents a likelihood that the employees employed by the employer will make the favorable recommendation action with respect to the employer; and
transmitting, by the one or more processors to the user computing device, a sixth presentation, causing the interactive user interface to display the sixth presentation, wherein the sixth presentation comprises at least one of the adjusted eNPS or an indication of a difference between the initial eNPS and the adjusted eNPS.

14. The method of claim 13, wherein each influence measure narrows the plurality of variables down to a subset that includes eNPS key driver variables representing those variables of the plurality of variables having a higher influence on the eNPS than other variables of the plurality of variables.

15. The method of claim 13, further comprising:
quantifying, by the one or more processors, an influence by a first eNPS key driver variable associated with a first eNPS key driver variable option of the first selection and a second eNPS key driver variable associated with the second eNPS key driver variable option of the second selection on eNPS.

16. The method of claim 13, wherein the adjusted eNPS is an index ranging from −100 to 100.

* * * * *

UNITED STATES PATENT AND TRADEMARK OFFICE
CERTIFICATE OF CORRECTION

| | | |
|---|---|---|
| PATENT NO. | : 11,657,414 B1 | |
| APPLICATION NO. | : 16/015121 | |
| DATED | : May 23, 2023 | |
| INVENTOR(S) | : Rohit Kichlu et al. | |

It is certified that error appears in the above-identified patent and that said Letters Patent is hereby corrected as shown below:

In the Claims

In Column 20, Line 5, Claim 1, delete "transmit" and insert -- transmit, --, therefor.

In Column 20, Line 24, Claim 1, delete "plurality first" and insert -- plurality of first --, therefor.

In Column 21, Line 43, Claim 7, delete "comprising server" and insert -- comprising at least one server --, therefor.

In Column 21, Line 63, Claim 7, delete "transmit" and insert -- transmit, --, therefor.

Signed and Sealed this
Eighth Day of August, 2023

*Katherine Kelly Vidal*

Katherine Kelly Vidal
*Director of the United States Patent and Trademark Office*